US005748860A

United States Patent [19]
Shively

[11] Patent Number: 5,748,860
[45] Date of Patent: May 5, 1998

[54] IMAGE PROCESSING DURING PAGE DESCRIPTION LANGUAGE INTERPRETATION

[75] Inventor: J. Thomas Shively, Hinsdale, Ill.

[73] Assignee: R.R. Donnelley & Sons Company, Lisle, Ill.

[21] Appl. No.: 467,461

[22] Filed: Jun. 6, 1995

[51] Int. Cl.$^6$ .................................................. G06K 15/00
[52] U.S. Cl. .......................... 395/114; 395/112; 395/109; 395/101; 358/452; 358/448
[58] Field of Search ...................................... 395/109, 112, 395/114–116, 162, 163, 101.1; 358/404, 261.4, 518, 457, 455, 452, 448; 382/167, 260

[56] References Cited

U.S. PATENT DOCUMENTS

| | | | |
|---|---|---|---|
| 5,226,175 | 7/1993 | Deutsch et al. | 395/119 |
| 5,239,625 | 8/1993 | Bogart et al. | 395/128 |
| 5,249,067 | 9/1993 | Hirosawa | 358/456 |
| 5,253,084 | 10/1993 | Rylander | 358/465 |
| 5,258,832 | 11/1993 | Rylander | 358/527 |
| 5,264,926 | 11/1993 | Rylander | 358/500 |
| 5,266,968 | 11/1993 | Stephenson | 347/214 |
| 5,297,217 | 3/1994 | Hamilton, Jr. et al. | 382/41 |
| 5,303,334 | 4/1994 | Snyder et al. | 395/109 |
| 5,305,118 | 4/1994 | Schiller et al. | 358/456 |
| 5,321,532 | 6/1994 | Ishikawa et al. | 358/534 |
| 5,321,773 | 6/1994 | Kopec et al. | 382/30 |
| 5,323,245 | 6/1994 | Rylander | 358/536 |
| 5,331,430 | 7/1994 | Xie et al. | 358/456 |
| 5,335,089 | 8/1994 | Xie et al. | 358/456 |
| 5,341,228 | 8/1994 | Parker et al. | 358/534 |
| 5,351,074 | 9/1994 | Kadowaki et al. | 395/115 |
| 5,410,641 | 4/1995 | Wakabayashi et al. | 395/112 |
| 5,455,617 | 10/1995 | Stephenson et al. | 347/214 |
| 5,465,165 | 11/1995 | Tanio et al. | 395/109 |
| 5,508,826 | 4/1996 | Lloyd et al. | 358/501 |
| 5,515,481 | 5/1996 | Pardo | 395/109 |
| 5,563,725 | 10/1996 | Kumada et al. | 358/518 |
| 5,570,459 | 10/1996 | Kam | 395/112 |

OTHER PUBLICATIONS

Joseph A. McSweeney, "Screenless Lithography," pp. 96–98, The Graphic Arts Monthly (Nov. 1965).

Excerpt from article, p. 60, The Graphic Arts Monthly (Jan. 1966).

PostScript® Language Reference Manual, Second Edition (Addison–Wesley Publishing Company Nov. 1994).

*Primary Examiner*—Dwayne Bost
*Assistant Examiner*—Tracy M. Legree
*Attorney, Agent, or Firm*—Marshall, O'Toole, Gerstein, Murray & Borun

[57] ABSTRACT

An image described in a page description language program is processed by an external image processing module, which may perform screening or color correction on the image. The processed image is then returned to the page description language program to be incorporated into a raster description of an output page. An image operator contained in the page description language program is redefined such the image operator transforms the image for compatibility with the external processing module and then invokes the external module to process the image.

43 Claims, 12 Drawing Sheets

| IMAGE SAMPLE VALUES (8 bits/component) (Integers 0-255) | DECODE ARRAY (Linear Mapping 0.0 to 1.0) | TRANSFER FUNCTION (adjustment for non-linear response) | LOOK-UP TABLE VALUES (converted back to integers 0-255) |
|---|---|---|---|
| 0 | 0.0 | 0.0 | 0 |
| .. | .. | .. | .. |
| 50 | 0.20 | 0.27 | 71 |
| .. | .. | .. | .. |
| 100 | 0.39 | 0.45 | 118 |
| .. | .. | .. | .. |
| 150 | 0.59 | 0.55 | 145 |
| .. | .. | .. | .. |
| 200 | 0.78 | 0.70 | 184 |
| .. | .. | .. | .. |
| 255 | 1.0 | 0.97 | 255 |

FIG. 8

IMAGE PROCESSING DURING PAGE DESCRIPTION LANGUAGE INTERPRETATION

FIELD OF THE INVENTION

The present invention relates to electronically modifying an image to be reproduced, and more particularly, to processing an image represented by a page description language.

BACKGROUND OF THE INVENTION

FIG. 1 is a simplified block diagram of a data processing system 10 which processes text and images to be reproduced using a page description language (PDL), such as the PostScript® language. (Postscript® is a registered trademark of Adobe Systems, Inc.). A computer or processor 12 is connected to a marking device 14 which includes a marking engine 16 for producing an output page 18. The marking device 14 may be, for example, a laser printer or an imagesetter which produces the output page 18 which may be, for example, a printed page, a printing plate, or a display.

The marking device 14 also includes a PDL interpreter 22, such as a Configurable PostScript® Interpreter (CPSI) from Adobe Systems, Inc., and a memory 23 associated with the PDL interpreter 22. The memory 23 may be internal of the marking device 14 or may be an external medium, such as a disk. The PDL interpreter 22 and memory 23 may alternatively be separate from the marking device 14 and may be included in the computer 12 or in an additional computer or processor.

An original source image 24 to be processed by the data processing system 10 is sampled by a scanner 26 to produce sampled image values which are stored in an image file 28 that is supplied to the computer 12. The image file may be stored, for example, in memory in the computer 12 or on a disk or another medium. Text 30, which may also include illustrations and line work, is also supplied to the computer 12 through an input device 32, such as a keyboard, a mouse or a scanner.

A publishing software package 34, such as Quark XPress or MicroSoft Word, stored in the computer 12 processes the text 30 and the image file 28 to generate a series of page description language commands which constitute a PDL description 36. The publishing software package 34 sends the PDL description 36 in a datastream to the PDL interpreter 22. The PDL description 36 describes the appearance of the text 30 and the source image 24 to be reproduced by the marking device 14 on the output page 18. The PDL interpreter 22 executes the PDL commands contained in the PDL description 36 to generate a raster description 38 of the output page 18. The raster description 38 may be stored in the memory 23 and is used to drive the marking engine 16 to generate the output page 18. If the marking device 14 is a binary device, the raster description 38 comprises a bitmap.

For reproducing images, the scanner 26 scans the original source image 24 by row or column to produce a sampled image comprising a rectangular array of dots, called pixels, for each color component of the image. Each pixel has a sampled image value (representing a density of a corresponding color) consisting of an n-bit integer, where there are $2^n$ different values possible for each pixel.

A page description language typically includes a command for creating the raster description 38 of the sampled image for rendering the image on the marking device 14. In the PostScript® language, the rendering command is the image or colorimage operator. In Level 1 implementations of the Postscript® language, the image operator is used to render gray-scale images and the colorimage operator must be used to render color images. Level 2 implementations allow the image operator to be used to render both gray-scale and color images.

Color images in the PostScript® language may be specified in several color spaces, including RGB, CMYK or CIE-based color spaces. The PDL interpreter 22 may have to perform color correction to convert the specified color space for compatibility with the color space of the marking device 14. Color correction may involve converting the sampled image values from one color space to another. For example, images specified in RGB may have to be converted to CMYK for rendering by a particular marking device 14. Color correction may also involve adjusting the color components for optimum rendering by a particular marking device. Further, if the marking device 14 is not capable of directly reproducing continuous tone sampled images, the PDL interpreter 22 will perform halftone screening on the sampled image using a simple threshold array. The raster description 38 resulting from these image processing operations is stored in the memory 23 or is provided to the marking engine 16 for rendering the image on the output page 18.

Assuming the PDL interpreter 22 is a PostScript® interpreter, the PDL interpreter 22 manages four different stacks, which are "last-in-first-out" (LIFO) data structures. These stacks include (1) an Operands Stack which holds (i) the input operands to the various Postscript® operators and (ii) the results of the operations, (2) an Execution Stack which is controlled by the PDL interpreter 22 and which holds executable objects (i.e. procedures and files) that are in stages of execution, (3) a Dictionary Stack which includes (i) a read only dictionary ("systemdict") which defines the implementation of the various PostScript® operators, (ii) a writable dictionary ("userdict") which stores all other definitions, and (iii) specialized dictionaries created by the user (e.g., an image dictionary), and (4) a Graphics State Stack which is used to store graphics information.

The original source image 24 is defined by a cartesian coordinate system, wherein each sampled image value corresponds to an (x, y) coordinate of a pixel. The PostScript® language is device independent such that coordinates specified in the PDL description 36 refer to a coordinate system that bears the same relationship to the output page 18 regardless of the marking device 14 used. The Postscript® coordinate system is called user space. As shown in FIG. 2, the PostScript® image operator imposes a coordinate system, known as image space, on the original source image 24 wherein the lower-left corner of the original source image 24 is the origin (0,0) and the upper-right corner is at (width, height). Each sample of the source image occupies one square unit in image space. Image space and user space are interrelated by an Image Matrix [IM], which is described below.

The marking device 14 is described by a coordinate system (called "device space") that varies depending on the particular marking device used. PostScript® language images may be transformed to a particular device space by a Current Transformation Matrix ([CTM]). The PostScript® language generates a default [CTM], which may be modified by the user to incorporate any translation, rotation or scaling of the original source image 24 on the output page 18. The user may modify the [CTM] through commands in the PDL description 36.

The PostScript® image operator requires five operands to define the image:

(1) Width—the width of the image in image space;
(2) Height—the height of the image in image space;
(3) Bits/Component—the number of bits in each sampled image value;
(4) Matrix—a matrix which specifies a coordinate transformation from user space to image space (the Image Matrix [IM], described in detail below); and,
(5) Datasource—a file, string or procedure which provides the sampled image values.

The PostScript® image operator recognizes the image file 28 as a rectangular array of width×height sampled values, each of which consists of n bits/components of date (where n is usually 8). In Level 2 applications of the PostScript® language, these operands may be contained as key-value pairs in an image dictionary created by the user.

In the simple case of a monochrome image, the Datasource operand supplies (height×width×bits/component) bits of information, wherein height and width are specified by the number of samples. For color images, each color component may be contained in a separate datasource or all the components may be combined in a single datasource which supplies (height×width×bits/components×number of color components) bits of information. (The PostScript® language refers to "color components" and also "bits/components." The "bits/components" operand could also be referred to as "bits/sample.")

In Level 1 PostScript® implementations, datasource must be a procedure which the image operator repeatedly executes to obtain the sampled image values. Datasource returns on the operand stack a string containing the sampled image values. In Level 2 PostScript® implementations, datasource may be a procedure, a string or a readable file object. Thus, the bit stream of sampled image values is either returned from a procedure or read from a file or string.

The Matrix operand of the Postscript® image operator contains the Image Matrix ([IM]), which defines a transformation from user space to image space. By convention, as shown in FIG. 2, the Image Matrix maps the unit square bounded by (0, 0) and (1, 1) in user space to the boundary of the source image in image space. The Image Matrix is used solely to describe the image itself, regardless of its position or orientation on the page. The Image Matrix is used to define an idealized image space consisting of a unit square that corresponds to the PostScript® language conventional coordinate system and scanning order. This idealized image space can then easily be mapped into device space (the coordinate system imposed by the marking device 14) to orient and position the image on the output page through the Current Transformation Matrix ([CTM]).

The configuration of the Image Matrix depends on the scanning of the original image. For an image scanned from left-to-right and bottom-to-top, [IM]=[width 0 0 height 0 0]. For an image scanned from left-to-right and top-to-bottom, [IM]=[width 0 0–height 0 height].

The Postscript® language uses the Current Transformation Matrix ([CTM]) to describe scaling, rotation, and translation of the image from user space to device space. For mapping the point (x, y) in user space to the point (x', y') in device space:

$$[CTM] = [a\ b\ c\ d\ tx\ ty],$$

where $x' = ax + cy + tx$ $y' = bx + dy + ty$ where a, b, c, and d determine the extent of scaling and rotation and where tx and ty determine the extent of translation.

The PostScript® colorimage operator requires the same five operands as the image operator as well a s at least two additional operands: Ncomp and Multi. The Ncomp operand specifies the number of color components for each sample. If Ncomp is 1, each sample has only one (gray) color component and the colorimage operator is identical to the image operator. Ncomp may also be 3 for RGB color space or 4 for CMYK color space. The Multi operand is a boolean that specifies the number of datasources from which the colorimage operator will obtain the sampled values. If Multi is false, the colorimage operator obtains all sampled components from a single datasource. If Multi is true, the sampled image values for each color component are contained in separate datasources.

Once the original source image 24 is converted to the appropriate color space, the PostScript® image operator (or colorimage operator) performs halftone screening on the sampled image. The screening operation creates the raster description 38 of the image in the memory 23 which can be rendered by the marking engine 16. In Level 1 PostScript® implementations, the image operator generates a threshold array from a supplied spot function to perform the screening. Level 2 PostScript® implementations allow the user to define the threshold array. Further, transfer functions can be defined to compensate for peculiarities of a specific marking device 14. Similarly, spot functions or explicit threshold arrays can be defined to fine tune the screening step for optimal output.

The interpreter 22 may also execute other PostScript® operators which perform other image processing operations on the sampled image. For example, black generation and undercolor removal procedures can be defined to assist in three color to four color conversions. Level 2 PostScript® color conversion is particularly suited for images described in a CIE-based color space but is not as flexible for images specified in the more common RGB or CMYK color spaces.

Therefore, while the Postscript® image processing procedures are adequate for some marking devices, they do not allow for optimal performance from other devices. For example, there is no conventional PostScript® method for generating a screened image via an error diffusion technique to reduce the effects of moire and the presence of artifacts in the resultant image rendered on the output page 18. Also, there is no procedure for considering all color components when generating values in a different color space.

SUMMARY OF THE INVENTION

In the present invention, the standard PostScript® image operator is renamed, and a new image operator which calls an external module to process the sampled image is created. The resultant raster description of the processed image is returned from the external module to PostScript® as an operand to the standard PostScript® image operator for output to a marking device.

According to one aspect of the present invention, a system for performing an external image processing operation on an image defined by sampled image values to be rasterized comprises a computer for generating a page description language description of the image and an interpreter for executing the page description. The interpreter includes invoking means for invoking the external image processing operation to process the image, and receiving means for receiving the processed image from the external image processing operation, wherein the processed image is incorporated into a raster description of an output page. The page description language description includes an image operator which incorporates the image into the raster description of the output page. The image operator is renamed and a new image operator which invokes the external image processing operation is defined. The invoking means comprises an external command operator that transfers the sampled image values to the external image processing operation. The external image processing operation may screen or perform color correction on the sampled image values. The interpreter, which may be a Configurable PostScript® Interpreter, may be contained in a marking device which renders the raster description of the output page.

According to another aspect of the present invention, a system for processing an image comprises defining means including a page description language for defining the image to be processed, processing means external of the defining means for processing the image, and transferring and returning means for transferring the image from the defining means to the processing means and returning the processed image to the defining means. The page description language may be the PostScript® language such that the PostScript® description of the image is executed by an interpreter. The transferring and returning means may be an external command operator.

According to yet another aspect of the present invention, a method for changing the operation of a page description language command in a page description language description comprises the steps of renaming the page description language command, defining a new operation for the page description language command including invoking an externally compiled module, executing the externally compiled module to perform the new operation of the page description language command, and returning a result of the execution of the externally compiled module to the page description language description.

According to still another aspect of the present invention, a method for using an external image processing module to process an image defined in a page description language description comprises the steps of renaming an image operator contained in the page description language description, wherein the image operator processes the image and incorporates the processed image into a raster description of an output page, defining a new image operator which invokes the external image processing module to process the image, processing the image using the external image processing module, returning the processed image to the page description language description, and invoking the renamed image operator to incorporate the processed image into the raster description of the output page.

According to yet another aspect of the present invention, a method for modifying operands contained in a page description language description during interpretation of the page description language description comprises the steps of transferring the operands to an external module, executing the external module to transform the operands into new operands, returning the new operands to the page description language description, and invoking a page description language operator to process the new operands.

BRIEF DESCRIPTION OF THE DRAWINGS

FIG. 8 is a table illustrating the application of a decode array and a transfer function to the range of sampled image values to generate a look-up table;

DETAILED DESCRIPTION

Figure 1:
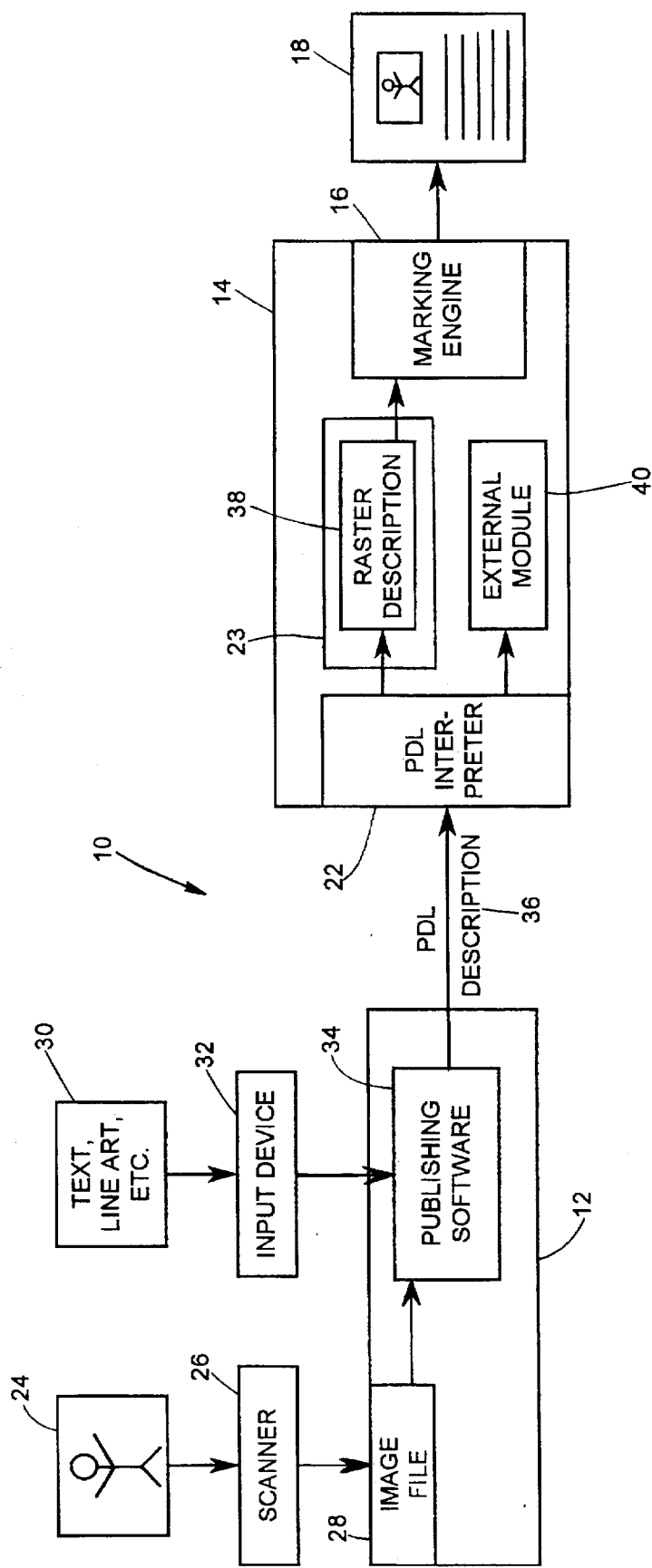
FIG. 1 is a simplified block diagram of an image processing system.
Figure 3:
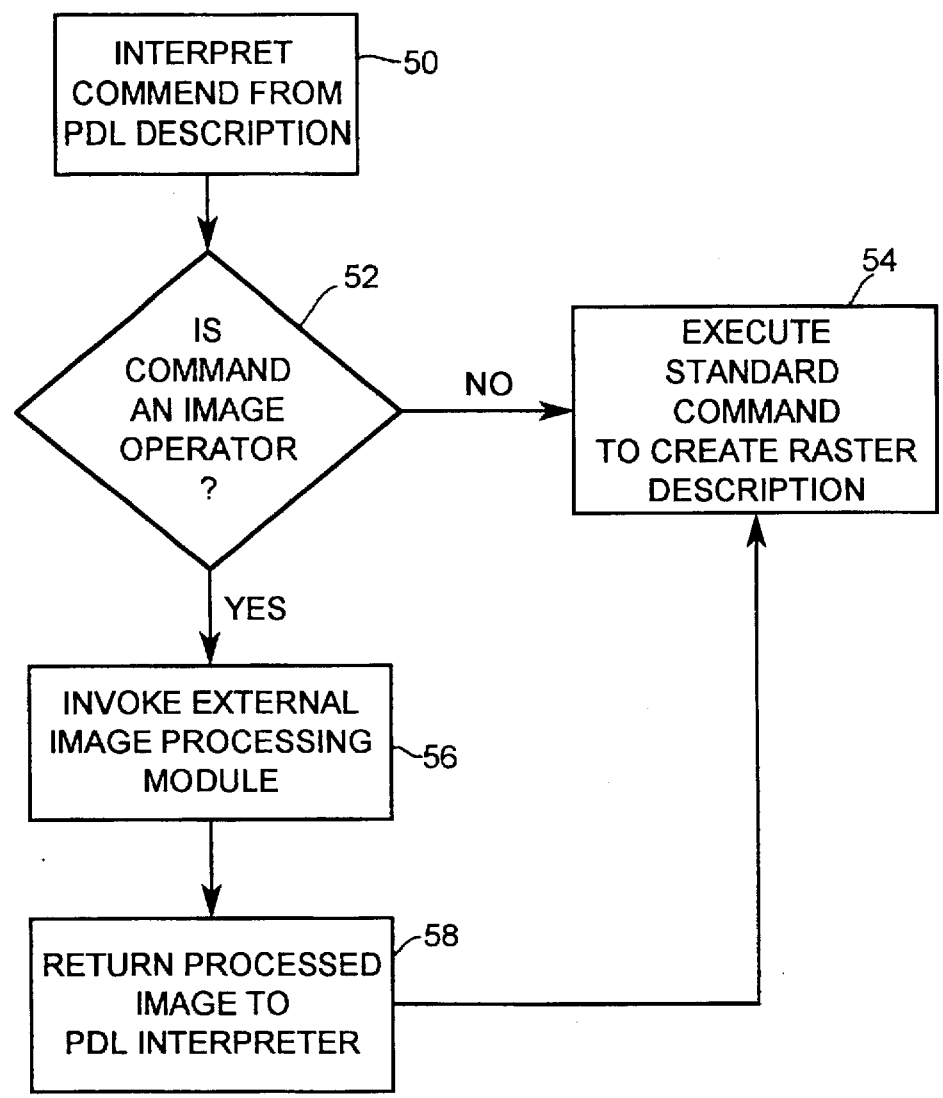
FIG. 3 is a simplified flowchart illustrating the process followed by a PDL interpreter for implementing the present invention.

The flowchart of FIG. 3 shows the general process implemented by the PDL interpreter 22 of the data processing system 10 of FIG. 1 in accordance with the present invention. The present invention involves the PDL interpreter 22 invoking an external module 40 to perform an image processing operation, such as screening or color correction on the sampled image. A program previously supplied to the PDL interpreter 22 redefines the image processing command in accordance with the present invention. The sampled image values stored in the image file 28 are incorporated into the PDL description 36 which is executed by the PDL interpreter 22 at block 50. A decision-making block 52 detects whether the current command in the PDL description 36 to be executed is the image (or colorimage) operator. If the block 52 determines that the command is not the image operator, the command is executed at a block 54. If the command is the image operator, a block 56 invokes the external module 40, which performs an image processing operation, such as screening or color correction, on the sampled image values. The image processing operation performed by the external module 40 enables more sophisticated techniques, such as error diffusion, screening or color correction to be applied to the sampled image for more precise rendering of the image on the output page 18 than is possible through the PDL interpreter 22 alone. A block 58 returns the resultant raster description of the processed image to the PDL interpreter 22 for incorporation into the raster description 38 of the entire output page 18 (block 54).

In a preferred embodiment, the external module 40 performs screening with error diffusion on the sampled image by using Accutone, a random screening process developed by R. R. Donnelley & Sons Co., the assignee of the present invention. The Accutone screening process is described in U.S. Pat. Nos. 5,331,430 and 5,335,089, which are incorporated herein by reference. Also, the present invention is particularly adapted for use with the PostScript® page description language (developed by Adobe Systems, Inc.), which is widely used in the printing industry. The Post- Script® language is fully described in the *Postscript® Language Reference Manual, Second Edition* (1990), from Adobe Systems, Inc., which is also incorporated herein by reference. However, the present invention could be modified and adapted for use with other image processing operations and/or other page description languages. For example, the external module 40 could perform color correction or image sharpening on the sampled image.

Figure 4:
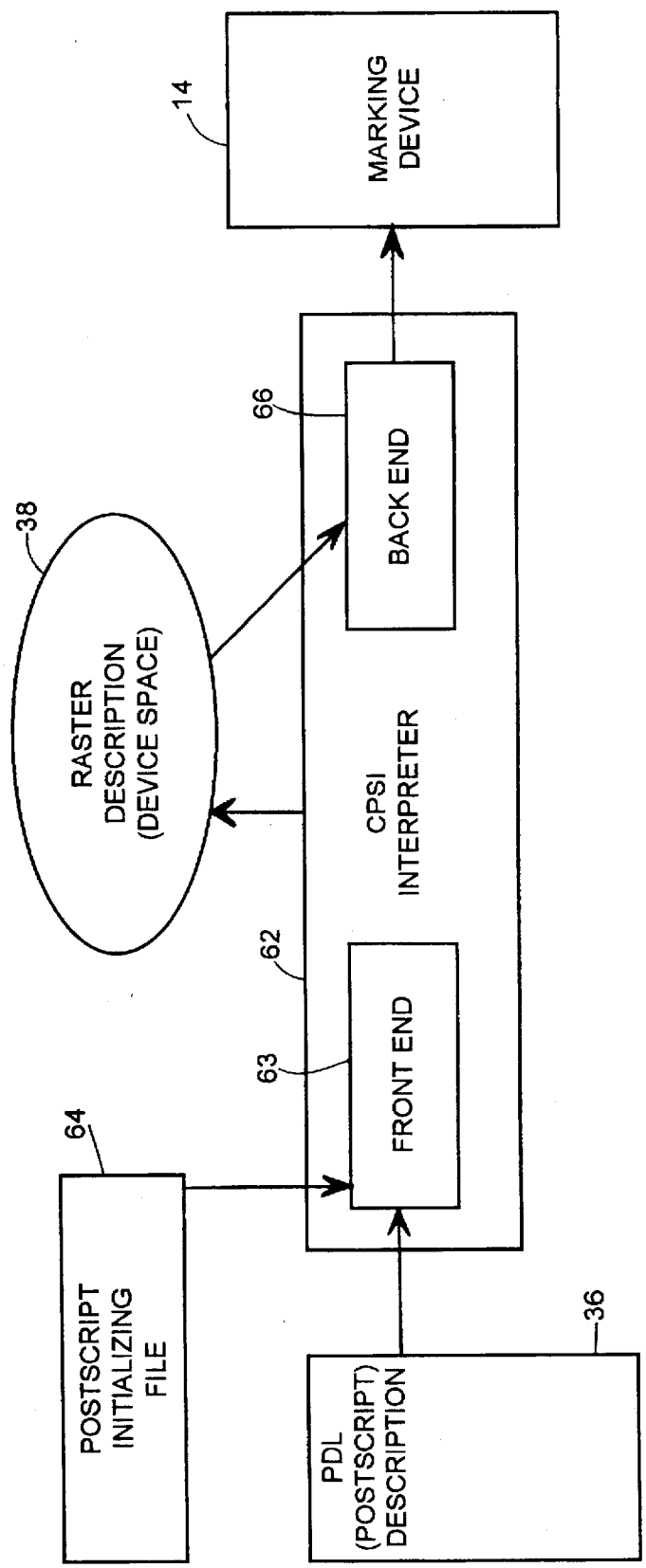
FIG. 4 is a block diagram illustrating the standard operation of a CPSI interpreter.

In a preferred embodiment of the present invention, the PDL interpreter 22 comprises a Configurable PostScript® Interpreter (CPSI) from Adobe Systems, Inc. FIG. 4 is a simplified block diagram of the standard operation of a CPSI interpreter 62. A front end 63 of the CPSI interpreter 62 may first execute a PostScript® initializing file 64. The PostScript® initializing file 64 provides commands that will be used repeatedly by the CPSI interpreter 62 during execution of the PDL (in this case PostScript® ) description 36. The PDL description 36 is supplied to the front end 63 of the CPSI interpreter 62 as a datastream or in a file. The CPSI interpreter 62 executes the commands and processes the supplied text and image data contained in the PDL description 36, creating the raster description 38 of the output page 18 in the memory 23. During normal operation, when the CPSI interpreter 62 executes the image operator contained in the PDL description 36, the CPSI interpreter 62 performs halftone screening on the sampled image values, and the resultant bitmap is incorporated into the raster description 38 of the output page 18. The raster description 38 may be stored in the memory 23 or may be sent to the marking device 14 through a back end 66 of the CPSI interpreter 22 for rendering of the output page 18 by the marking engine 16.

Figure 5:
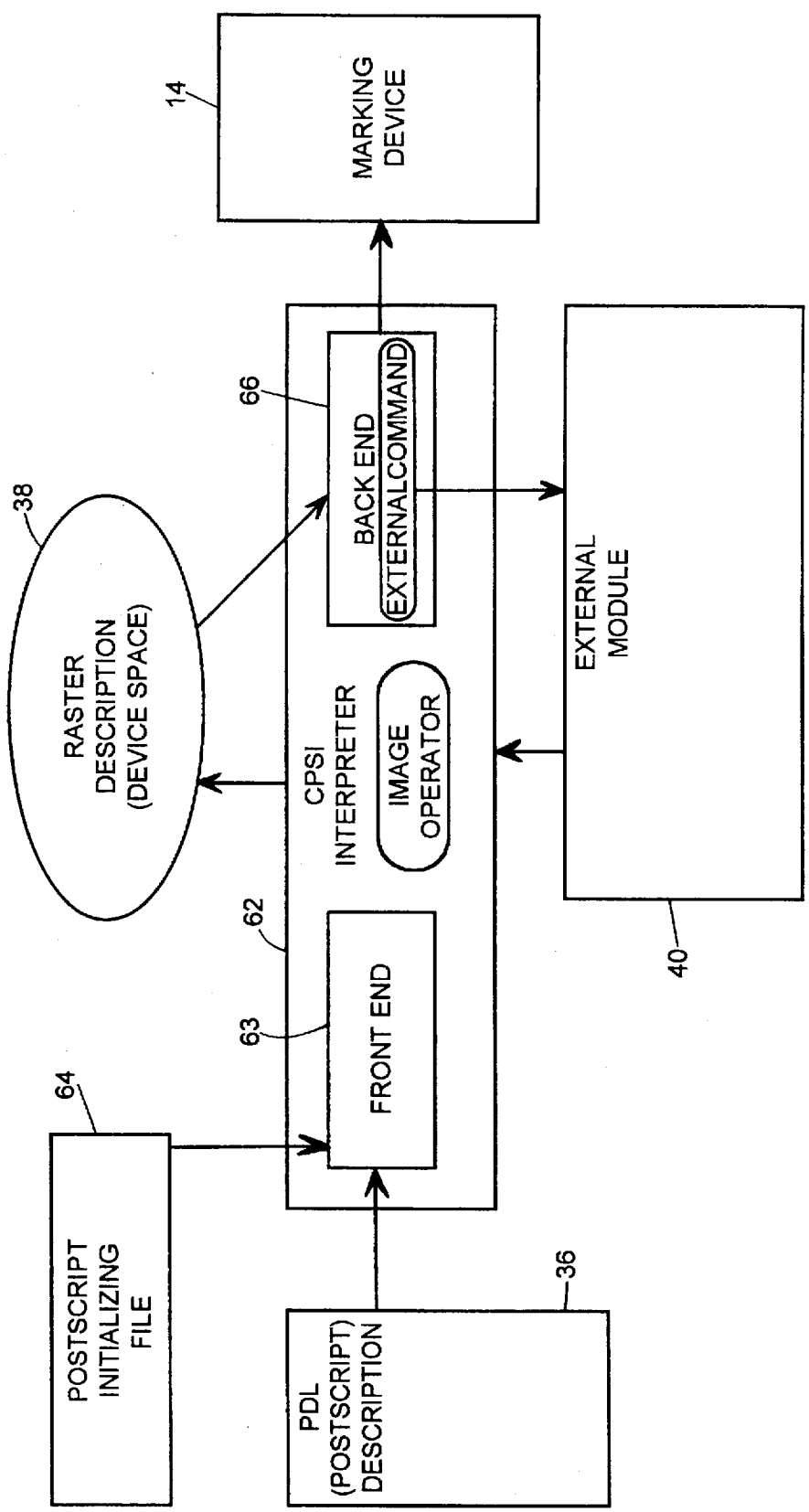
FIG. 5 is a block diagram illustrating the operation of the CPSI interpreter according to the present invention, wherein the interpreter invokes an external module to process an image.

As shown in FIG. 5, the back end 66 of the CPSI interpreter 62 supports a procedure set operator, called "externalcommand", which allows the separately compiled external module 40 to gain access to a command string from the PostScript® Operand Stack and return a response string to the Operand Stack during the execution process. According to a preferred embodiment of the present invention, the standard PostScript® image operator is redefined and a new image operator is defined. The PostScript® code for these operations may be supplied in the PDL initializing file 64 or may be supplied at the beginning of the PDL description 36. Thus, when the CPSI interpreter 62 executes the PDL description 36, images are processed according to the previously defined new image operator.

The new image operator uses the externalcommand to access the external module 40 to process the image. The external module 40 performs one or more image processing operations, such as screening, color correction, or unsharp masking, on the sampled image and returns the processed image to the CPSI interpreter 62. The original image operator is then executed to incorporate the externally processed image into the raster description 38 of the output page 18.

Figure 6:
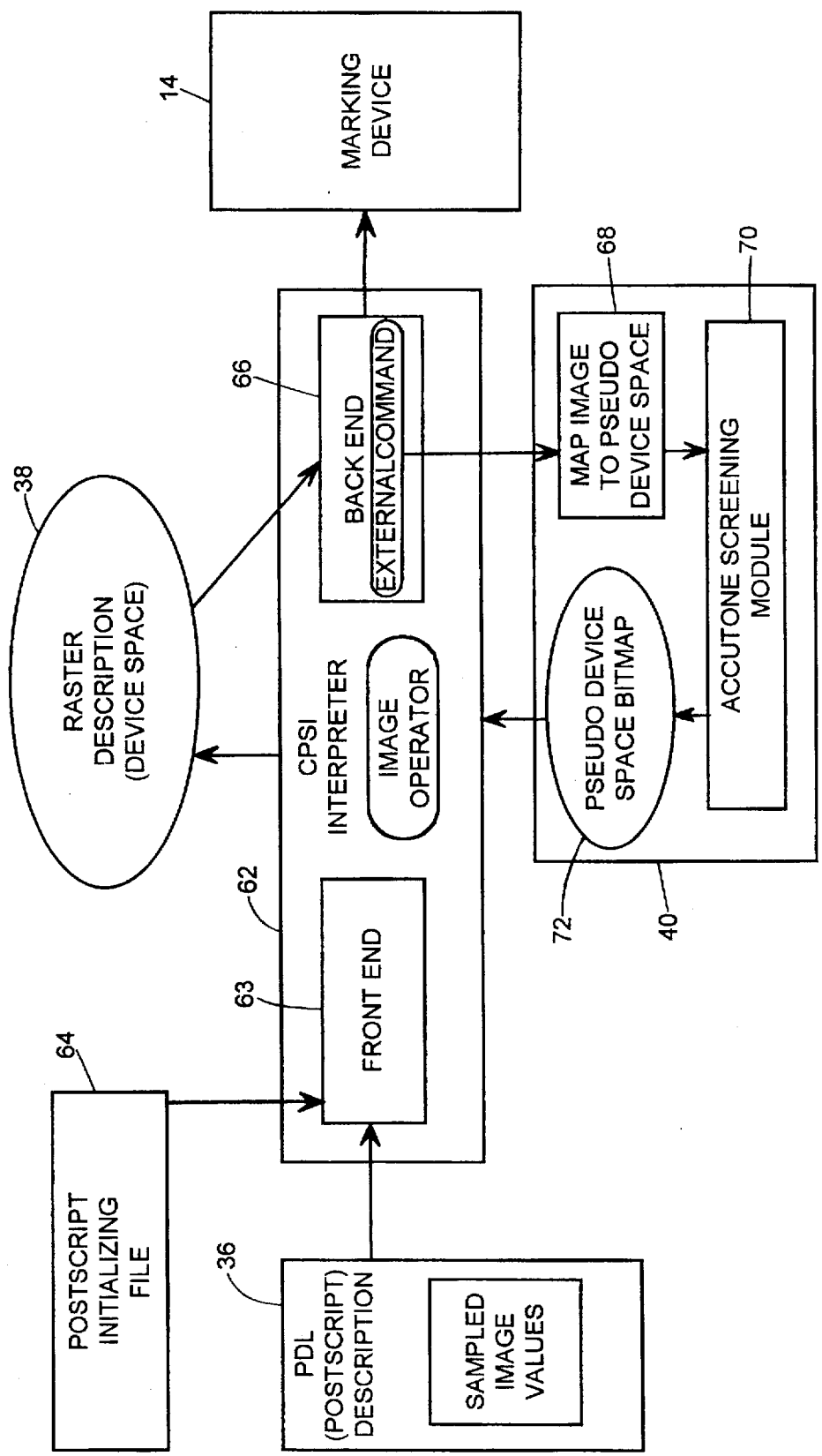
FIG. 6 is a block diagram illustrating the operation of the CPSI interpreter according to the preferred embodiment of the present invention, wherein the external module performs Accutone screening on the image.

The preferred embodiment of the invention, wherein the external module 40 performs Accutone error diffusion screening on the sampled image, is illustrated in FIG. 6. A block 68 of the external module 40 first maps the sampled image values to pseudo device space. Pseudo device space is a scaled version of device space wherein the resolution matches the resolution dictated by the Accutone screening module 70. The Accutone module 70 then screens the sampled image values, creating a pseudo device space bitmap 72 which is returned to the CPSI interpreter 62 and converted to device space. The standard PostScript® image operator incorporates the Accutone-screened device space bitmap into the raster description 38 of the output page 18 for rendering by the marking engine 16.

Figure 7A:
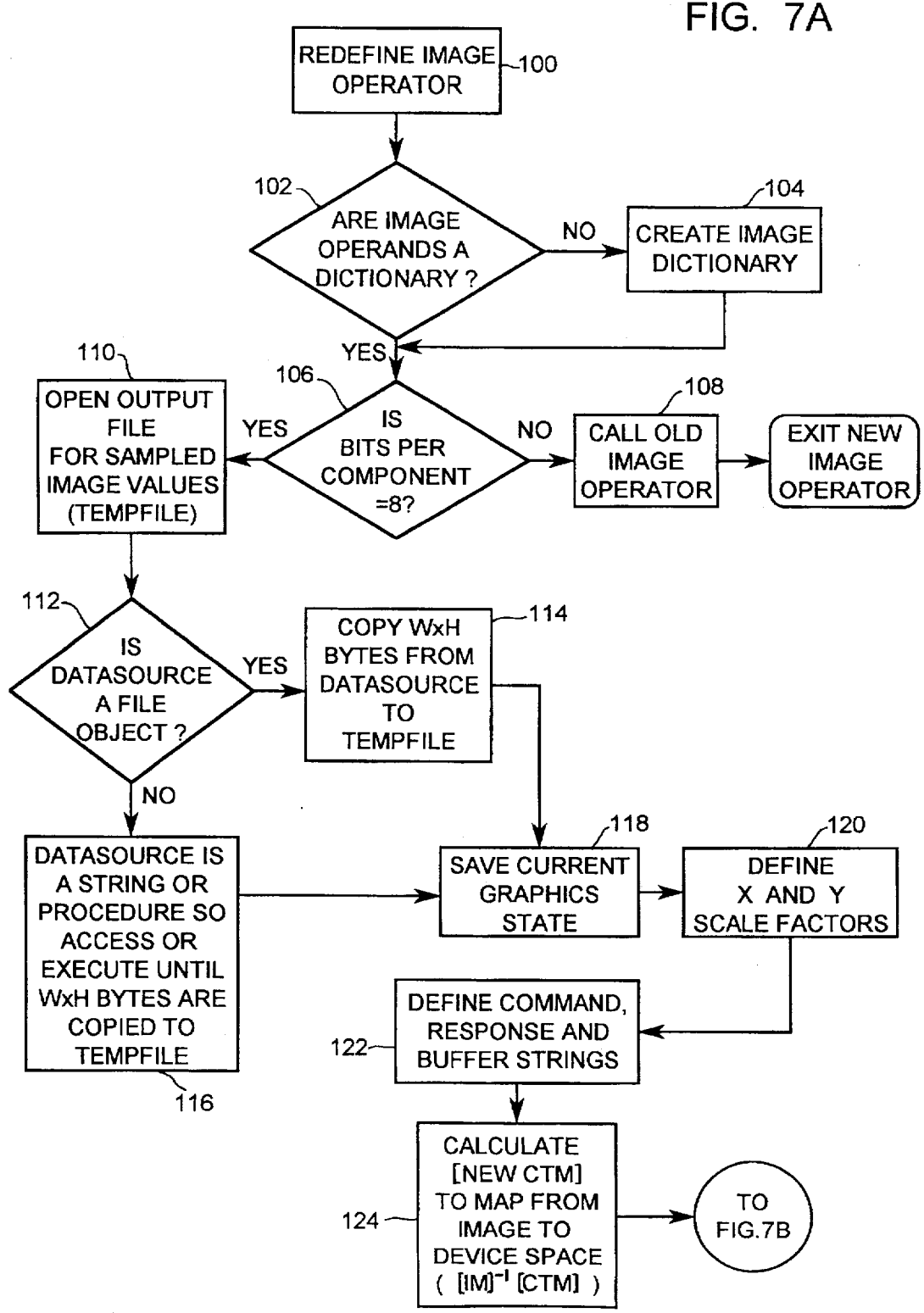
FIGS. 7A & 7B comprise a flowchart illustrating in detail the program steps for defining the new PostScript® image operator which are executed by the CPSI interpreter for invoking the external module to screen the image.
Figure 7B:
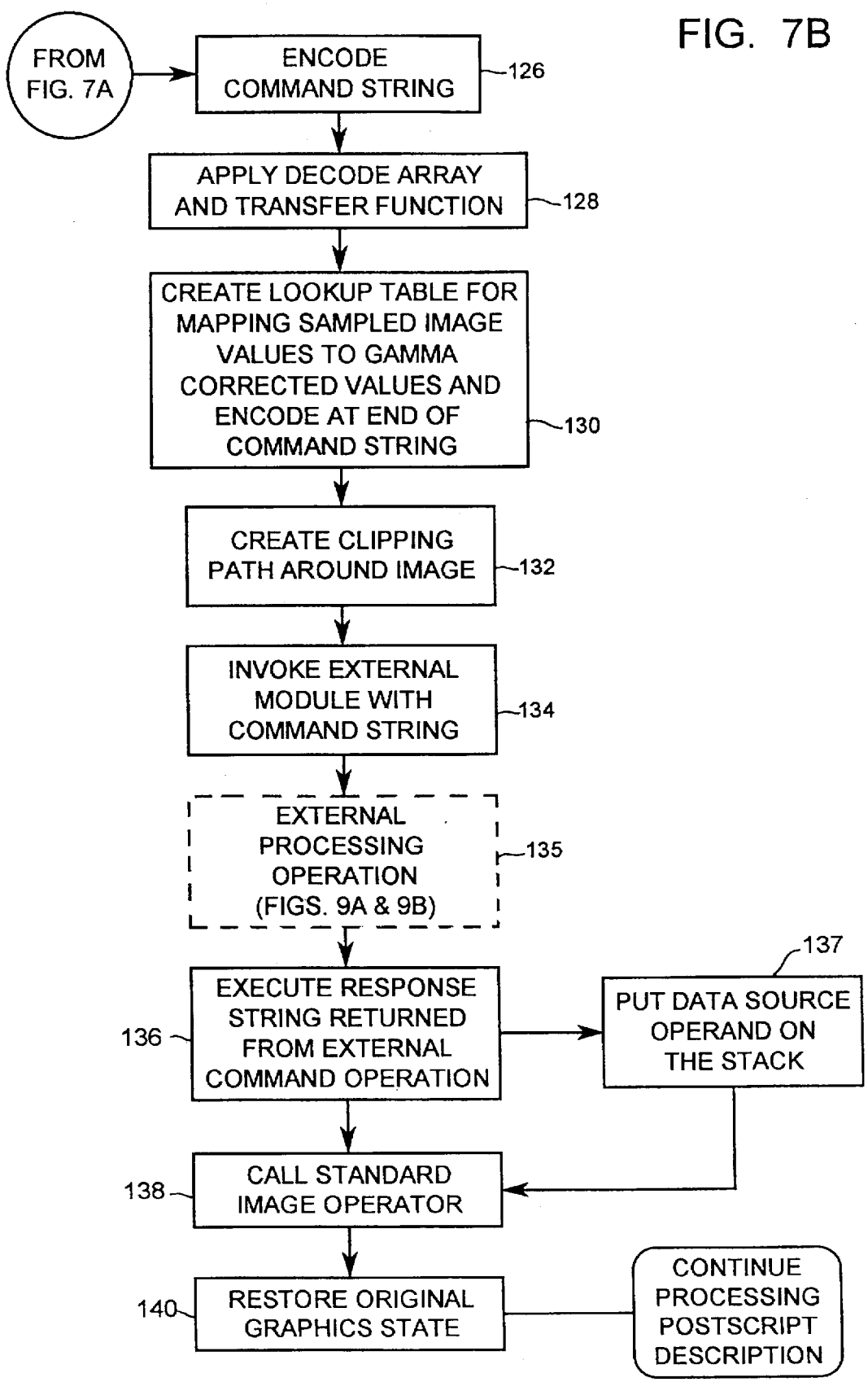

DEFINITION OF THE NEW POSTSCRIPT® IMAGE OPERATOR:

FIGS. 7A and 7B comprise a flowchart of the program that is executed by the CPSI interpreter 62 to redefine the PostScript® image operator in order to call the external module 40 to process the image. The program of FIGS. 7A and 7B may be stored in the PostScript® initializing file 64 or may be provided at the beginning of the PDL description 36 that is supplied to the CPSI interpreter 62. The program of FIGS. 7A and 7B is specifically directed to screening the image using the Accutone error diffusion module. However, the program may also be adapted to perform other image processing operations, such as color correction.

A block 100 changes the name of the standard PostScript® image operator, which was described above in the Background of the Invention. (Although this description will refer only to the PostScript® image operator, it is understood that a similar program could also be applied to redefine the colorimage operator). The name of the standard image operator may be changed, for example, to "systemdict_image", since it is defined in the systemdict dictionary. The block 100 also sets up a new image operator (called "image") which will be defined by the remaining program and used whenever the CPSI interpreter 62 receives an image command from the PDL description 36. The new image operator uses the five image operands (width, height, bits/component, matrix and datasource) and invokes the external module 40 to screen the sampled image.

The block 100 may be implemented by the following PostScript® code:

```
/systemdict_image systemdict /image get def
/image { . . . . } def
```

A block 102 determines whether the image operands are supplied in a dictionary or individually on the Operands Stack. If the operands are supplied individually on the Stack, a block 104 groups the supplied operands into an image dictionary. Although blocks 102 and 104 are not necessary for implementing the present invention, they provide convenient access to the image operands. The blocks 102 and 104 may be implemented by the following code:

```
dup type 1 dict type eq {
dup begin
20 dict begin
/PopOperands { pop } def
/DeviceGray /DeviceGray currentcolorspace 0 get eq
    /Separation currentcolorspace 0 get eq or def
} {
20 dict begin
/ImageType 1 def
/DataSource 1 index def
/ImageMatrix 2 index def
/BitsPerComponent 3 index def
/Height 4 index def
/Width 5 index def
/MultipleDataSources false def
/Decode [0 1] def
20 dict begin
/PopOperands { pop pop pop pop pop } def
/DeviceGray true def
} ifelse
```

The code listings contained herein assume that the current color space is or can be treated like DeviceGray (a monochrome image). However, the program could be easily modified for use with other color spaces, such as RGB, CMYK or CIE-based.

In the preferred embodiment (using Accutone to screen the image), the number of bits per component of the sampled image values must be eight. A block 106 determines the value of the image operand "BitsPerComponent" and, if it is not equal to eight, a block 108 calls the standard image operator (which was renamed "systemdict_image" by the block 100) and exits the new image operator. Thus, if the bits per component of the sampled image values is not eight, the CPSI interpreter 62 performs the standard PostScript® halftone screening on the sampled image. The blocks 106 and 108 are not necessary for external processing modules that do not require eight bits per component. However, a similar process may be used to allow the user to select standard PostScript® image processing or the external module processing. The blocks 106 and 108 may be implemented by the following code:

---

```
BitsPerComponent 8 ne DeviceGray not or
    end end
    systemdict_image
    { }
```

---

If the bits per component of the sampled image values are eight, a block 110 then opens a temporary output file (called "tmpfile") to store the sampled image values obtained from the image file 28 via the PDL description 36. The temporary output file may be stored, for example, in the memory 23. The sampled image comprises width×height number of bytes, which are accessed through the datasource operand. In the preferred embodiment, a block 112 determines whether datasource is a file, a string, or a procedure. If datasource is a file, a block 114 copies width×height number of bytes from datasource into tmpfile. If datasource is a string or a procedure, a block 116 repeatedly accesses or executes datasource until width×height number of bytes are copied into tmpfile. The temporary output file, "tmpfile," now contains the sampled image values. The blocks 110–116 may be implemented by the following code:

---

```
(tmpfile) (w) file
dup type
/DataSource load type eq {
    Width string
    DataSource
    Height {
        dup 2 index readstring not {
            pop dup 0 setfileposition exit
        } if
        3 index exch writestring
    } repeat
    pop
} {
    Width Height mul {
        1 index DataSource dup length
        3 1 roll
        writestring sub dup 0 le
            exit
        } if
    } loop
} ifelse
pop flushfile
```

---

Alternatively, if the colorimage operator with more than one datasource is used, a similar process could open a temporary output file for each color component or could combine all the component values into one temporary output file.

A block 118 saves a copy of the current graphics state. The current graphics state, includes, for example, color spaces, fonts, the clipping path and other graphics information. The block 118 allows any graphics information to be saved before the CPSI interpreter 62 calls the externalcommand to perform the external processing operation, which will alter the graphics state. Thus, after the external processing operation is performed, the graphics state can be restored. The block 118 may be implemented by the following code:

gsave

The Accutone screening process operates at a resolution (typically between 600 and 1200 dpi) which may be different from the resolution of the marking device 14. Thus, a block 120 defines the x and y Accutone scale factors (called "scale-x" and "scale-y") to be equal to the marking device resolution divided by the Accutone resolution. For example, if the x and y scale factors are equal to 3, the block 120 may implement the following code:

---

```
/SCALE_X 3 def
/SCALE_Y 3 def
```

---

These scale factors will later be used by the external module 40 to convert the image coordinates between pseudo device space and device space.

A block 122 defines a command string, a response string and a buffer string. The command string will be used to provide the necessary information to the external module 40 and the response string will be used to return the output from the external module 40 to the CPSI interpreter 62. The buffer string will be used as temporary storage to encode the necessary operands into the command string. The block 122 may define these strings using the following code:

---

```
/Index 0 def
/CommandString 512 string def
/ResponseString 1024 string def
/NumBuf 32 string def
```

Figure 2:
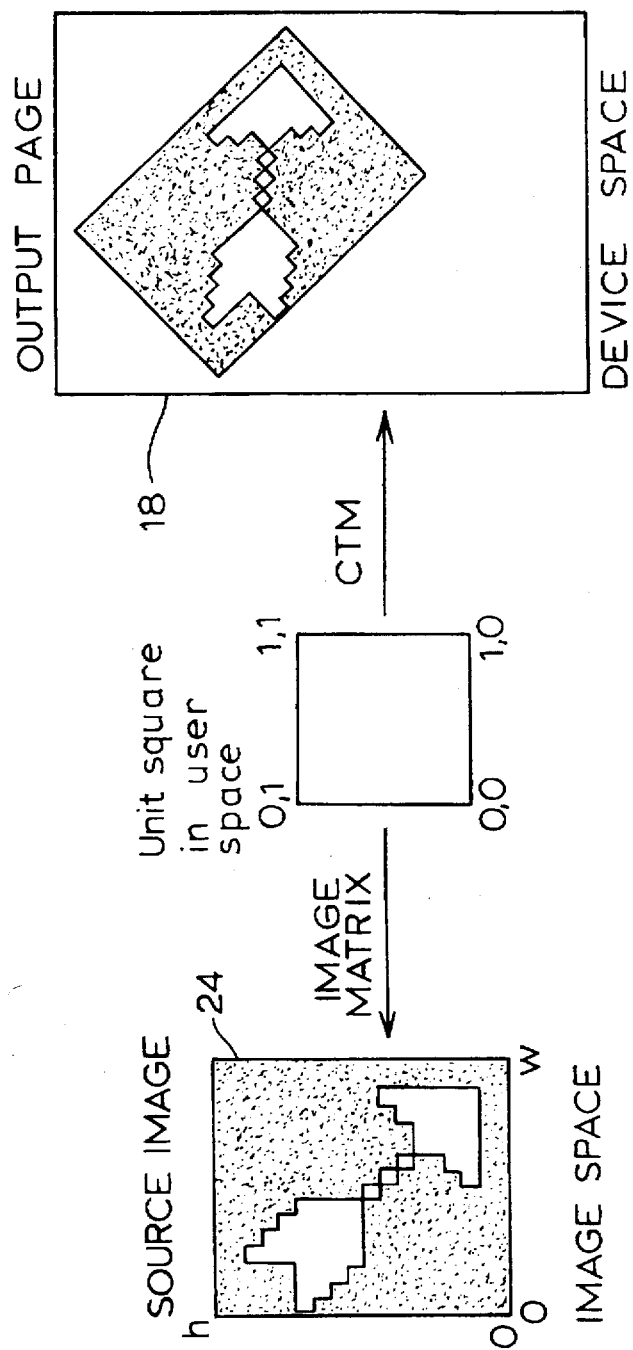
FIG. 2 is a diagram illustrating the mapping between coordinate systems used by the PostScript® language to define an image.

--- the matrix operand of the PostScript® image operator supplies the Image Matrix [IM] (described in the Background of the Invention) which specifies the transformation of the sampled image values' coordinates from user space to image space. The Current Transformation Matrix [CTM] (also described in the Background of the Invention) specifies the transformation from user space to device space and also incorporates any scaling, translation and/or rotation of the image in device space. (See FIG. 2). A block 124 inverts the Image Matrix and concatenates it with the Current Transformation Matrix to form a new matrix (called "[new CTM]"), which specifies a transformation from image space to device space. Thus, [new CTM]=[IM]$^{-1}$ [CTM]. The matrix manipulation of the block 124 may be implemented by the following code:

ImageMatrix matrix invertmatrix
concat

A block 126 uses the buffer string defined by the block 122 to encode the command string that will later be accessed by the external module 40. The command string is encoded with the image operands width and height and the scale factors (scale-x and scale-y) which were defined by the block 120. The [new CTM] calculated by the block 124 is also encode d into the command string and will be used by the external module 40 to implement any scaling, translation and/or rotation of the image while mapping the image to pseudo device space.

In the preferred embodiment, the information in the command string should be converted to ASCII for compatibility with the external module 40, which is implemented in the C language. Further, a null ("0") is added at the end of the command string in conformity with C language convention. The command string may be encoded by the block 126 by the following code:

```
CommandString Index matrix currentmatrix { cvr NumBuf cvs
   dup length 2 index add 4 1 roll putinterval
   dup CommandString exch 32 put CommandString exch
   1 add
   } forall
Width NumBuf cvs dup length 2 index add 4 1 roll putinterval
   dup CommandString exch 32 put CommandString exch
   1 add
Height NumBuf cvs dup length 2 index add 4 1 roll
   putinterval dup CommandString exch 32 put
   CommandString exch
   1 add
SCALE_X NumBuf cvs dup length 2 index add 4 1 roll
   putinterval dup CommandString exch 32 put
   CommandString exch
   1 add
SCALE_Y NumBuf cvs dup length 2 index add 4 1 roll
   putinterval dup
CommandString exch 0 put
1 add
```

A block 128 applies a decode array and a transfer function to the range of sampled image values. The operation of the decode array and the transfer function is illustrated in FIG. 8, it being understood that FIG. 8 is used for illustration purposes only and the values listed therein do not necessarily represent the actual values used by the block 128. (The values of the decode array of FIG. 8, for example, are rounded-off values.)

The decode array describes how to map the range of sampled image values into a range of values appropriate for the chosen color space. Assuming 8 bits per component, the sampled image values are integers in the range of 0 to 255. In DeviceGray color space, for example, the decode array specifies a linear function for mapping the range of sampled image values into component values in the range of 0.0 to 1.0.

After applying the decode array, the transfer function adjusts the component values to compensate for non-linear response in the marking device 14 and the human eye. This process is also known as gamma correction. In the preferred embodiment, an Accutone specific transfer function previously downloaded to the CPSI interpreter 62 is used. For example, the Accutone specific transfer function could be defined by the following code:

```
/AccutoneGammaCorrection [
0  1  2  4  5  6  7  8  9  9 10 11 12 13 13 14 15 15 16 17
17 18 19 19 20 20 21 21 22 22 23 23 24 24 25 25 26
26 27 27 28 28 29 29 30 30 30 31 31 32 32 32 33 33
34 34 34 35 35 36 36 36 37 37 37 38 38 38 39 39 40
40 40 41 41 41 42 42 42 43 43 43 44 44 44 44 45 45
45 46 46 46 47 47 47 48 48 48 49 49 49 50 50 50
50 51 51 51 52 52 52 52 53 53 53 54 54 54 54 55 55
55 55 56 56 56 56 57 57 57 57 58 58 58 58 59 59 59
59 60 60 60 60 61 61 61 61 62 62 62 62 63 63 63 63
64 64 64 64 65 65 65 65 65 66 66 66 66 67 67 67 67
68 68 68 68 68 69 69 69 69 69 70 70 70 70 71 71 71
71 71 72 72 72 72 72 72 73 73 73 73 74 74 74 74 74 75
75 75 75 75 76 76 76 76 77 77 77 77 77 77 78 78 78
78 78 79 79 79 79 79 80 84 89 95 101 107 111 117
123 130 137 144 152 160 168 176 185 194 203 212
221 230 239 249 255
] def
```

Alternatively, the transfer function could be supplied by the PostScript® language according to the specified color space.

In PostScript® , the transfer function is a procedure that is called with a number in the range 0.0 to 1.0 (i.e. the output of the decode array) and returns a number in the same range that has been transformed into the gamma-corrected component value.

After application of the transfer function, the values are inverted because Accutone assumes low digital values are highlights and high digital values are shadows, which is the opposite of PostScript® convention. However, the inversion could also be implemented internally in the Accutone program. A block 130 converts the output from the transfer function back to integers (0 to 255 for 8 bits per component), and creates a look-up table which specifies the transformation of the range of the sampled image values to their gamma-corrected values. This look-up table (called "LUT") is then added to the end of the command string. The blocks 128 and 130 may be implemented with the following code:

```
/Dmin Decode 0 get def
/Dmax Decode 1 get def
0 1 255 {
    exch dup Commandstring exch 4 -1 roll
    Dmax Dmin sub mul 255 div Dmin add
    currenttransfer exec
    255 mul
    cvi
    /AccutoneGammaCorrection where {      %
        pop                                %
        AccutoneGammaCorrection exch get   %
    } if                                   %
    255 exch sub                           %
    put 1 add
} for
pop
```

In the above-listed code, the lines marked with "%" are included only in the preferred embodiment which uses the previously defined Accutone specific transfer function.

The completed command string, which will be accessed by the externalcommand operator, now contains the following information:

{ [new CTM], width, height, scale-x, scale-y, 0, LUT }

A block 132 creates a clipping path which defines the area in the raster description 38 of the output page 18 where the image will be rendered. The clipping path is created around the image by defining a path between the corners (0, 0), (width, 0), (width, height) and (0, height) around the image, wherein width and height are the dimensions of the image in image space. The clipping path is created because the Accutone screening process returns a bitmap which may contain a rotated rendition of the original image. The clipping path prevents any text or graphics surrounding the image from being overwritten by the image when the image is incorporated into the raster description 38 of the output page 18. The coordinates of the corners of the image in image space which define the clipping path will be mapped to pseudo device space by the external module 40. Thus, the clipping path will properly define the image-rendering area in the raster description 38 of the output page 18 regardless of any translation, rotation or scaling of the image. (See FIG. 10).

The block 132 may create the clipping path around the image by the following code:

newpath 0 0 moveto
    Width 0 lineto
    Width Height lineto
    0 Height lineto
    closepath clip Next, a block 134 invokes the external command operator with the command string and the empty response string. The block 134 may be implemented by the following code:

```
/CPSI /ProcSet findresource
begin
CommandString ResponseString externalcommand
end
```

The externalcommand operator calls the external processing module 40 at a block 135. In the preferred embodiment, the external module 40 is Accutone, which performs error diffusion on the sampled image values to create a bitmap of the screened image, and returns a set of instructions to the CPSI interpreter 62 in the response string. The external processing module 40 will be described in detail in connection with FIGS. 9A and 9B.

A block 136 then executes the response string returned from the external module 40. The execution places the first four image operands (width, height, bits/component, and matrix) on the Operand Stack. A block 137 then places the datasource operand, a procedure which reads the Accutone output, on the stack. These operands will be accessed by the systemdict_image operator (the renamed standard PostScript® image operator A block 138 then calls the systemdict_image operator, and a block 140 restores the original graphics state. The CPSI interpreter 62 then continues processing the remaining commands in the PDL description 36. The blocks 136 through 140 will be described in greater detail after the description of the external processing module.

THE EXTERNAL PROCESSING MODULE

Figure 9A:
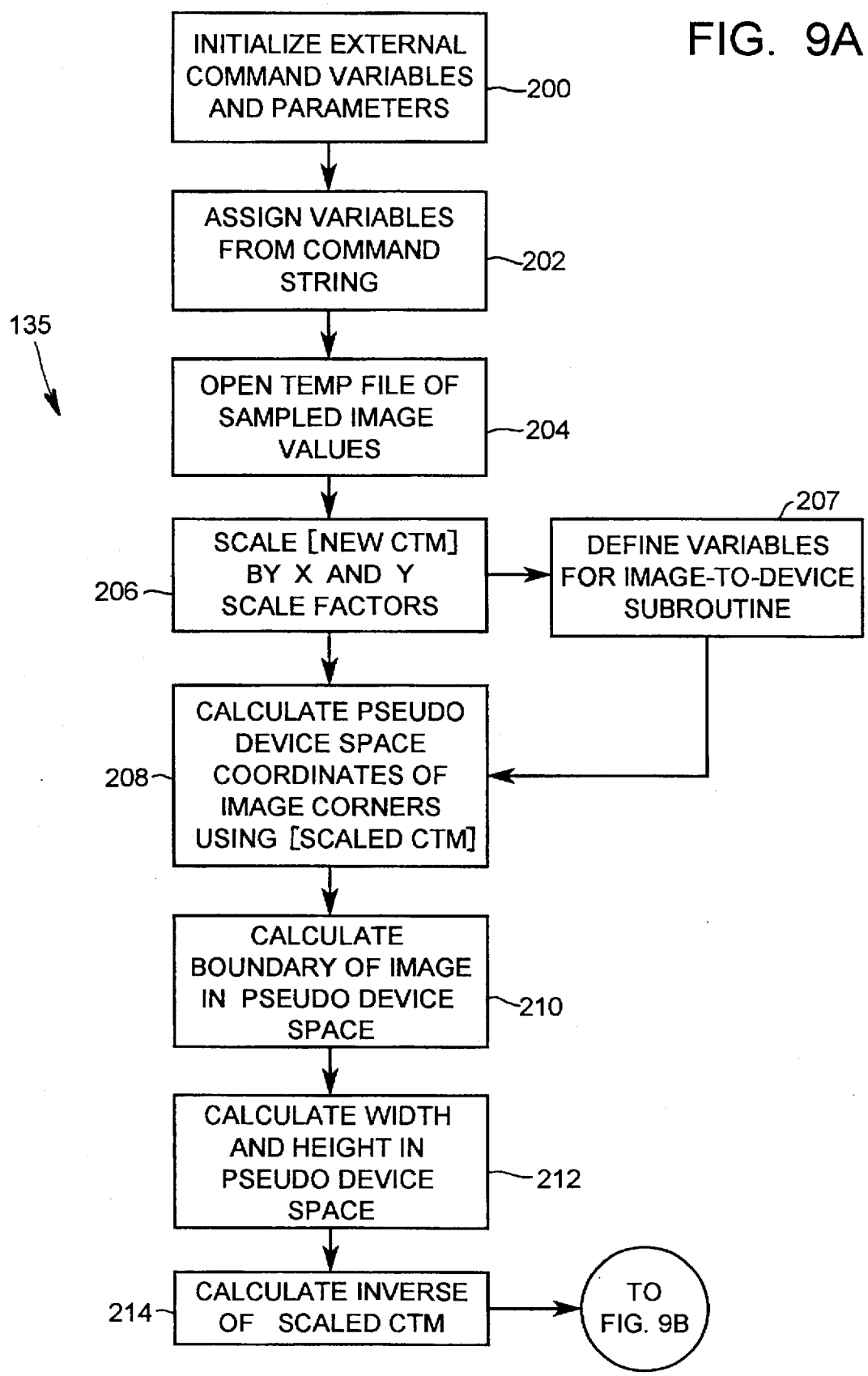
FIGS. 9A & 9B comprise a flowchart illustrating in detail the program steps of the external processing operation used to screen the image.
Figure 9B:
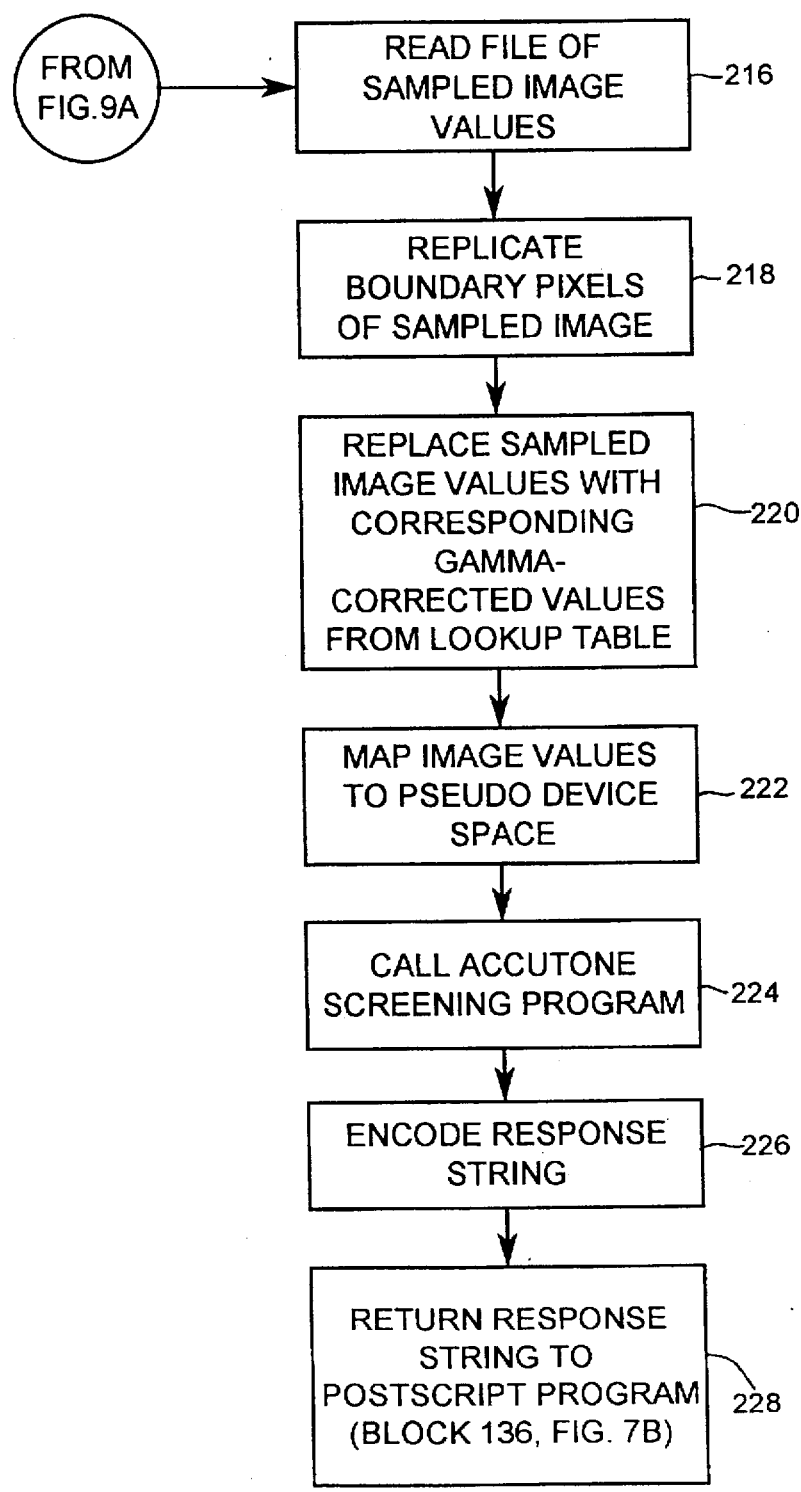

FIGS. 9A & 9B comprise a flowchart of the program steps of the external module 40 (the block 135 of FIG. 7B) which processes the sampled image. Specifically, the program of FIGS. 9A & 9B illustrate the process for performing Accutone screening on the sampled image.

Blocks 200 through 204 initialize the program of the external module 40 to manipulate the image values and the information received from the command string which was created by the blocks 126 and 130 of FIG. 7B. The block 200 allocates storage for, and initializes, the variables that will be used by the program. These variables include, for example, the response string, the width and height of the image, the input and output files, etc. The block 200 may be implemented by the following C code:

```
int ExternalCommand (interpreter, engine, command,
    commandLength, response, responseLength,
    privateHandle)
    CPSIInterpreter interpreter,
    CPSIEngine *engine;
    char *command
    unsigned commandLength;
    char *response;
    unsigned *responseLength;
    unsigned char *privateHandle;
{
    int width, height;
    double a, b, c, d, tx, ty;
    int fh, fhOut, fhRes;
    char *sb;
    int lines, i;
    int ImageToDevice ();
    int scale_x, scale_y;
    int bytesout;
    char *lut;
```

The block 202 associates the values in the command string (the [new CTM] elements, width, height, scale-x, scale-y, and the look-up table) with the selected C variables. The block 202 also sets up a pointer for the look-up table, LUT. The block 202 may be implemented by the following C code:

```
sscanf (command, "%1f %1f %1f %1f %1f %1f %d %d %d %d",
    &a, &b, &c, &d, &tx, &ty, &width, &height,
    &scale_x, &scale_y);
lut = command + strlen(command) + 1;
```

The block 204 opens the read only file, "tmpfile," which contains the sampled image values and was created by the blocks 110–116 in FIG. 7A. Also, a second temporary file ("tmpfile.res") is opened for writing. The block 204 may be implemented by the following C code:

```
fh = open ("tmpfile", O_RDONLY);
fhRes = open ("tmpfile.res", O_RDWR|O_CREAT|O_TRUNC
    S_IREAD|S_IWRITE);
```

A block 206 scales the [new CTM] values by the scale-x and scale-y scale factors, which were calculated by the block 120 of FIG. 7A and encoded into the command string. The block 206 thus creates a scaled current transformation matrix ([scaled CTM]) which specifies a mapping from (x, y) coordinates in image space to (x', y') coordinates in pseudo device space (device space scaled at Accutone resolution). The [scaled CTM] contains the values [a b c d tx ty], wherein:

```
x' = ax + cy + tx
y' = bx + dy + ty
(x, y) = coordinate of a sampled image value in image space
(x', y') = coordinate of a sampled image value in pseudo
    device space
```

The elements of the [scaled CTM] may be calculated by the following code:

```
a /= scale_x;
b /= scale_x;
c /= scale_y;
d /= scale_y;
tx /= scale_x;
ty /= scale_y;
```

A block 207 defines and initializes a second set of variables that will be used by a subroutine (called "ImagetoDevice") which uses the [scaled CTM] to map the sampled image values from image space coordinates to pseudo device space coordinates. The block 207 may be implemented by the following code:

```
ImagetoDevice (a, b, c, d, tx, ty, fh, fhRes, w, h,
        width, height, lut)
    double a, b, c, d, *tx, *ty;
    int fh, fhRes, w, h, *width, *height;
    char * lut;
{
    char *sb;
    char *sbLine;
    char *sbCurrent;
    double x00, xw0, x0h, xwh, y00, yw0, y0h, ywh,
        txp, typ, xmin, ymin, xmax, ymax;
    double det, ai, bi, ci, di, txi, tyi, tmp1, tmp2;
```

-continued

```
int i, j, imax, jmax, imin, jmin, iImage, jImage;
    unsigned int bytes;
int interpolate = TRUE;
```

Figure 10:
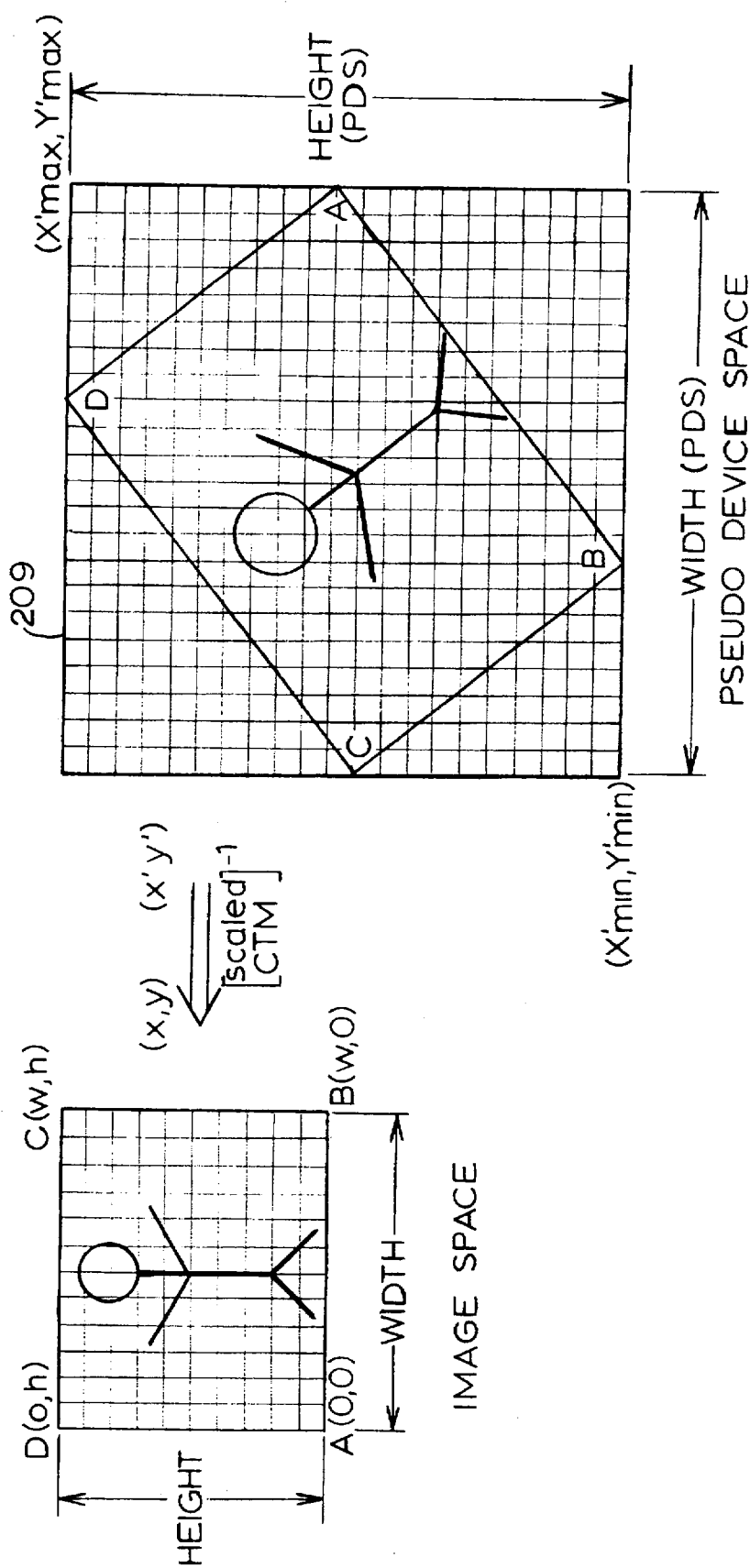
FIG. 10 illustrates the mapping of the image from image space to pseudo device space.

The ImagetoDevice subroutine begins with a block 208 which uses the [scaled CTM] to determine the pseudo device space coordinates of the corners of the image in image space. Referring to FIG. 10, the corners A, B, C and D of the sampled source image in image space are at (0, 0), (width, 0), (width, height) and (0, height). The [scaled CTM] mapping provides for any scaling, translation and/or rotation of the image as specified in the original PostScript® [CTM]. The block 208 may be implemented by the following code:

```
x00 = *tx;
y00 = *ty;
xw0 = a * w + *tx;
yw0 = b * w + *ty;
x0h = c * h + *tx;
y0h = d * h + *ty;
xwh = a*w + c*h + *tx;
ywh = b*w + d*h + *ty;
```

According to the above code, the pseudo device space coordinates of the image corners A, B, C and D are as follows:

```
A = (x00, y00)
B = (xw0, yw0)
C = (xwh, ywh)
D = (x0h, y0h)
```

A block 210 then calculates the boundary of the image in pseudo device space (represented by the box 209 in FIG. 10) by determining the maximum and minimum x and y coordinates of the corners of the image in pseudo device space. This may be implemented by the following code:

```
tmp1 = x00 < xw0 ? x00: xw0;
tmp2 = x0h < xwh ? x0h: xwh;
xmin = tmp1 < tmp2 ? tmp1: tmp2;
tmp1 = y00 < yw0 ? y00: yw0;
tmp2 = y0h < ywh ? y0h: ywh;
ymin = tmp1 < tmp2 ? tmp1: tmp2;
tmp1 = x00 > xw0 ? x00: xw0;
tmp2 = x0h > xwh ? x0h: xwh;
xmax = tmp1 > tmp2 ? tmp1: tmp2;
tmp1 = y00 > yw0 ? y00: yw0;
tmp2 = y0h > ywh ? y0h: ywh;
ymax = tmp1 > tmp2 ? tmp1: tmp2;
```

A block 212 calculates the width and height of the image in pseudo device space and may be implemented by the following code:

```
imax = xmax > 0.0 ? xmax + .5: xmax - .5;
imin = xmin > 0.0 ? xmin + .5: xmin - .5;
*width = imax - imin;
jmax = ymax > 0.0 ? ymax + .5: ymax - .5;
jmin = ymin > 0.0 ? ymin + .5: ymin - .5;
*height = jmax - jmin;
```

A block 214 calculates the inverse of the [scaled CTM], which specifies a mapping from pseudo device space to image space. The elements of the inverse of the [scaled CTM] may be implemented by the following code:

```
det = a*d - c*b
ai = d / det;
bi = -b / det;
ci = -c / det;
di = a / det;
txi = (c*(*ty) - d*(*tx)) / det;
tyi = (b*(*tx) - a*(*ty)) / det;
```

A block 216 reads the sampled image values which are stored in the temporary file, "tmpfile," which was created by blocks 110 through 116 of FIG. 7A. The sampled image values are read into an allocated block of memory with (width+2)×(height+2) number of bytes. A pointer ("sb") is assigned and initially points to the first byte of the allocated memory region, which is treated as a rectangular array with (height+2) rows and (width+2) columns. (The additional two rows and columns allow memory space for the replication of the boundary pixels, as explained below). The sampled image values from the temporary file are read by row into the array of memory which is indexed by the pointer. The block 216 may be implemented by the following code:

```
bytes = (w+2) * (h+2);          /* allocate memory */
sb = malloc (bytes);
for (j = 1; j <= h; j++) {       /* read image values */
    read (fh, sb + j*(w+2)+1, w);  /* fh = tmpfile */
```

After the sampled image values are stored in the memory array, a block 218 replicates the boundary pixels of the array. Thus, additional pixels, which are required for interpolation, are added around the boundary of the image in image space. The additional memory allocated by the block 216 provides the memory required for the replication of the boundary pixels. The block 218 may be implemented by the following code:

```
for (j = 1; j <= h; j++)  {
    int offset = j*(w+2);
    sb[offset] = sb[offset+1];
    sb[offset+w+1] = sb[offset+w];
    }
for (i = 0; i < w+2; i++) {
    sb[i] = sb[i + w+2];
    sb[(h+1)*(w+2) + i] = sb[h*(w+2) + i];
    }
```

A block 220 then uses the look-up table (LUT) containing the gamma-corrected sampled image values corresponding to the range of sampled image values (generated by the blocks 128 and 130 of FIG. 7B; See FIG. 8) to convert the sampled image values stored in the memory array to their gamma-corrected values. The sampled image values stored in the memory array are replaced by their corresponding gamma-corrected values stored in the look-up table. The block 220 may be implemented by the following code:

```
for (i = 0; i < bytes; i++)
    sb[i] = lut[sb[i]];
```

A block 222 completes the ImagetoDevic subroutine by mapping the gamma-corrected image space sampled image values to pseudo device space coordinates. Referring to FIG. 10, in the preferred embodiment, this mapping is implemented using the inverse of the [scaled CTM] (calculated by the block 214), which specifies the following transformation:

| coordinate in pseudo device space (x', y') | --> [scaled CTM]⁻¹ --> | coordinate in image space (x, y) |
|---|---|---|

For each pixel in pseudo device space, the corresponding coordinate in image space is calculated using the inverse of the [scaled CTM]. The value of the sampled image value at the image space coordinate is estimated and stored into the corresponding pseudo device space coordinate. The estimate can be made by replicating the value of the pixel nearest the desired coordinate or by interpolating the value using the pixels surrounding the desired coordinate. Preferably, a bilinear interpolation method is used. The pseudo device space sampled image values are then written to the intermediate file (tmpfile.res) which was created at the block 204. These values will be used as inputs to the Accutone screening process.

Alternatively, the mapping of the sampled image values into pseudo device space coordinates could be implemented by other methods, such as a direct mapping from image space to pseudo device space using the [scaled CTM]. With direct mapping, the sampled image values have to be replicated (e.g. by interpolation) to fill the additional pseudo device space pixels.

The block 222 may be implemented by the following code:

```
sbLine = malloc (*width);
for (j = jmin; j < jmax; j++) {
  sbCurrent = sbLine;
  bzero (sbCurrent, *width);
  if (interpolate)
    for (i = imin; i < imax; i++, sbCurrent++) {
      double A, B, C, D, alpha, alphaprime, beta,
          x, y;
      iImage = (x = ai*i + ci*j + txi + 1.0);
      beta = x - iImage;
      if (iImage >= 0 && iImage < w+2) {
        jImage = (y = bi*i + di*j + tyi + 1.0);
        alpha = y - jImage;
        alphaprime = 1.0 - alpha;
        if (jImage >= 0 && jImage < h+2) {
          A = sb[jImage*(w+2) + iImage];
          B = sb[jImage*(w+2) + iImage + 1];
          C = sb[jImage+1)*(w+2) + iImage];
          D = sb[jImage+1)*(w+2) + iImage + 1];
          *sbCurrent = (A*alphaprime+C*alpha) * (1.0
             -beta) +(B*alphaprime+D*alpha) *beta;
        }
      }
    }
  else
    for (i = imin, i < imax; i++, sbCurrent++) {
      iImage = ai*i + ci*j + txi + 1.0;
      if (iImage >= 0 && iImage < w+2) {
        jImage = bi*i + di*j + tyi + 1.0;
        if (jImage >= 0 && jImage < h +2)
          *sbCurrent = sb[jImage*(w+2) + iImage];
      }
    }
  write (fhRes, sbLine, *width)
}
```

After the mapping operation is complete, the intermediate file (tmpfile.res) contains a bytemap of the gamma-corrected sampled image values at pseudo device space resolution. A block 224 then calls the Accutone screening program, which takes the intermediate file (tmpfile.res), the dimensions of the intermediate file, and the scale-x scale factor as inputs. The block 224 may be implemented by the following code:

```
accutone ("tmpfile.res", width, height, "tmpfile.out",
    "map.p5p2", 14, scale_x, "MASK", "map.edm", 0)
```

(In the above-listed code, "map.p5p2", "MASK", and "map.edm" are files and 14 is a seed to a random number generator used during the Accutone screening process). The Accutone screening program performs error diffusion to screen the image and returns an output bitmap file ("tmpfile.out") of the screened image values. A description of the Accutone screening process is included in U.S. Pat. Nos. 5,331,430 and 5,335,089, which were incorporated by reference above.

A block 226 builds a response string which will be returned to the block 136 of the FIG. 7B PostScript® program. The response string contains executable PostScript® code which will set up the operands to the standard PostScript® image operator (systemdict_image) using the Accutone output bitmap file (tmpfile.out) containing the bitmap of the screened image values as the datasource operand.

The response string includes PostScript® commands for opening the Accutone output file and defining a string buffer to read lines from the file. The response string also includes the dimensions of the file (width and height) and the Image Matrix [IM] and Current Transformation Matrix [CTm] values which will be used by the systemdict_image operator. These variables may be defined as follows:

```
[IM] = [1 0 0 1 0 0]
[CTM] = [1 0 0 1 tx' ty']
    where tx' = (xmin) (x-scale)
          ty' = (ymin) (y-scale)
Width = width (x-scale)
Height = height (y-scale)
```

The block 226 may build the response string with the following code:

```
*tx = xmin;
*ty = ymin;
bytesout = scale_x * width;
if ((bytesout % 8)  ! = 0)
    bytesout = bytesout/8+1);
else
    bytesout = bytesout / 8;
sprintf (response,
    "/Infile (tmpfile.out) (r) file def
    /LineBuf %d string def
    /Width %d def
    /Height %d def
    [1 0 0 1 %1f %1f] setmatrix mark
        Width Height 1 [1 0 0 1 0 0]",
    bytesout, width*scale_x, height*scale_y,
        tx*scale_x, ty*scale_y);
*responseLength = strlen (response);
```

Once the response string is encoded, the response string is automatically returned to the block 136 of the FIG. 7B PostScript® program by a block 228.

As shown in FIG. 7B, the block 136 executes the response string that is returned from the block 226 of the FIG. 9B external processing operation to place the first four systemdict_image operands on the stack (width, height, bits/component and matrix). The block 136 may be implemented by the following code:

cvx exec

A block 137 then places the fifth operand (datasource) on the stack. Datasource is a procedure which f reads the screened image bitmap from the Accutone output file. If the datasource operand to the systemdict_image operator contains binary data (a bitmap) which contains no rotation or size change (is at device resolution), the systemdict_image operator will detect this, and will bypass the standard PostScript® halftone screening of the image as it is incorporated into the raster description 38 of the output page 18. The Accutone output file, however, contains unrotated, binary data at pseudo device space resolution, which is a scaled version of device resolution. Therefore, the Accutone output which is read by the datascurce operand may be modified to skip the unnecessary PostScript® screening and decrease the image processing time.

In the preferred embodiment, for processing efficiency, the Accutone module, as disclosed in U.S. Pat. Nos. 5,331, 430 and 5,335,089, repeats the bits in the x-direction by the scale-x scale factor and the PostScript® datasource operand supplies each line from the Accutone output file scale-y number of times to the systemcit_image operator. This operation provides the systemdict_image operator with binary data at device resolution. However, the bit replication could also be implemented in both the x and y direction by Accutone, by PostScript®, or in any combination of Accutone and PostScript®.

The block 137, including the scale-y bit replication, may be implemented by the following code :

```
{
counttomark 0 eq {
    Infile Linebuf readstring pop
    dup dup
    } if
} bind
```

Once the response string is executed, and the above procedure is read, the stack contains all five operands for the systemdict_image operator. The block 138 calls the systemdict_image operator which incorporates the screened image into the raster description 38 of the output page 18. The original image dictionary and the image operands are then removed from the Operands Stack. The block 140 restores the original graphics state and the CPSI interpreter 62 continues processing the PDL description 36. The blocks 138 and 140 may be implemented by the following code:

systemdict_image pop

PopOperands end end grestore

The CPSI interpreter 62 continues to execute the PDL commands in the PDL description 36 that describe, for example, text and graphical shapes. The above-described operations will be repeated when the CPSI interpreter 62 receives another image operator to be executed from the PDL description 36.

The above-described programs which perform Accutone screening on the sampled image could be modified to perform other image processing operations, such as color correction. Color correction may be used to convert color components to a different color space or to adjust color components within a color space. For example, the present invention could be used to convert images specified in RGB color space to the CMYK color space used by a particular marking device 14. The external module 40 would include a look up table specifying the transformation from RGB to CMYK which incorporates any device-specific modifications. The steps of saving the graphics state, specifying a clipping path and mapping the image to pseudo device space could be eliminated. The external module 40 would receive the RGB sampled image values and use the look up table and an interpolation technique to generate the corresponding CMYK values. The CMYK values would be returned as the datasource (or as multiple datasources) to the standard PostScript® image operator. The [CTM] and the Width, Height, and Matrix operands would be the same as those supplied with the original image. A similar procedure could also be used to correct and adjust CMYK (or any other color space) specified color components for a particular marking device. Further, an image sharpening process such as unsharp masking, could be implemented in a similar manner.

The present invention could also be used to redefine a different PostScript® operator to perform an external operation. For example, the PostScript® "painting" operators (such as stroke or fill) require a current color in the current color space to be defined to specify the color to be rendered. The current color is defined by the "setcolor" operators, such as setcolor, setrgbcolor or setcmykcolor. The present invention could redefine a setcolor operator to perform color correction for rendering by a specific marking device 14.

For example, a CMYK marking device requires a sophisticated translation of an RGB specified color. The setrgbcolor operator (whose operands are the RGB specified color components) could be redefined to call the external module 40 to perform the translation to CMYK color space. The external module 40 would receive the RGB color components as inputs and convert them to CMYK components by using, for example, a look up table and an interpolation technique. The CMYK components would then be returned in the response string as operands to the standard setcmykcolor operator. This would allow the PostScript® "painting" operators to be used for rendering RGB specified colors on a CMYK marking device.

Further, use of the external module 40 for processing images or for other operations allows for faster processing of operations that require complicated mathematics and/or the use of sophisticated arrays.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

It is claimed:

1. A system for performing an external image screening operation on an image defined by sampled image values to be rasterized, comprising:

a computer for generating a page description language description of the image; and, an interpreter for executing the page description language description, including, invoking means for calculating a coordinate transformation of the sampled image values and for invoking the external image screening operation to screen the image, and receiving means for receiving the screened image from the external image screening operation, wherein the screened image is incorporated into a raster description of an output page.

2. The system of claim 1, wherein an image operator included in the page description language description incorporates the image into the raster description of the output page.

3. The system of claim 2, wherein the image operator is renamed and a new image operator is defined.

4. The system of claim 3, wherein the invoking means comprises an external command operator that transfers the sampled image values to the external image screening operation.

5. The system of claim 4, wherein the new image operator invokes the external command operator.

6. The system of claim 1, wherein the external image screening operation screens the sampled image values.

7. The system of claim 6, wherein the sampled image values are screened with error diffusion.

8. The system of claim 1, wherein the interpreter is contained in a marking device which renders the raster description of the output page.

9. The system of claim 1, wherein the interpreter is a Configurable PostScript® Interpreter.

10. A system for screening an image, comprising:
- defining means for defining the image to be screened, wherein the defining means includes a page description language;
- screening means for screening the image, wherein the screening means is external of the defining means;
- means for calculating a coordinate transformation of the image between the defining means and the screening means; and
- transferring and returning means for transferring the image from the defining means to the screening means and returning the screened image to the defining means.

11. The system of claim 10, wherein the page description language is the PostScript® language.

12. The system of claim 11, wherein the defining means is a PostScript® description of the image.

13. The system of claim 12, wherein the PostScript® description of the image is executed by an interpreter.

14. The system of claim 10, wherein the transferring and returning means is an external command operator.

15. The system of claim 10, wherein the screening means performs screening with error diffusion on the image.

16. A method for changing the operation of a page description language command in a page description language description, comprising the following steps performed by a data processing system:
   a) renaming the page description language command;
   b) defining a new operation for the page description language command including invoking an externally compiled module;
   c) executing the externally compiled module to perform the new operation of the page description language command; and
   d) returning a result of the execution of the externally compiled module to the page description language description.

17. The method of claim 16, wherein an external command operator of a page description language interpreter is used for invoking the externally compiled module of step (b).

18. The method of claim 17, wherein the result of the execution of the externally compiled module is returned to the renamed page description language command.

19. The method of claim 18, wherein the page description language command is the PostScript® image operator.

20. The method of claim 19, wherein the externally compiled module performs an image processing operation on an image received by the PostScript® image operator.

21. The method of claim 20, wherein the externally compiled module performs screening with the error diffusion on the image.

22. The method of claim 20, wherein the externally compiled module performs color correction on the image.

23. The method of claim 17, wherein the page description language command is a first PostScript® setcolor operator.

24. The method of claim 23, wherein the new operation of the first PostScript® setcolor operator transfers color components specified in a first color space to the externally compiled module.

25. The method of claim 24, wherein the externally compiled module converts the specified color components to a second color space.

26. The method of claim 25, wherein the externally compiled module uses a look up table and interpretation to convert the color components to a second color space.

27. The method of claim 25, wherein the externally compiled module returns the converted color components to a second PostScript® setcolor operator.

28. The method of claim 27, wherein the first PostScript® setcolor operator is setrgbcolor and the second PostScript® setcolor operator is setcmykcolor.

29. A method for using an external image screening module to screen an image having sampled image values defined in a page description language description, comprising the following steps performed by a data processing system:
   a) renaming an image operator contained in the page description language description, wherein the image operator screens the image and incorporates the screened image into a raster description of an output page;
   b) defining a new image operator which calculates a coordinate transformation for the sampled image values and invokes the external image screening module to screen the image;
   c) screening the image using the external image screening module;
   d) returning the screened image to the page description language description; and
   e) invoking the renamed image operator to incorporate the screened image into the raster description of the output page.

30. The method of claim 29, wherein the external image screening module performs screening with error diffusion on the image.

31. The method of claim 30, wherein the step of defining the new image operator further comprises
   transferring the sampled image values to an output file.

32. The method of claim 31, wherein the step of screening the image using the external image screening module further comprises the steps of:
   i) reading the sampled image values from the output file;
   ii) gamma-correcting the sampled image values; and
   iii) mapping the sampled images values to transformed coordinates defined by the coordinate transformation, before screening the image.

33. A method for modifying operands contained in a page description language description during interpretation of the page description language description, comprising the steps of:
   a) transferring the operands to an external module;
   b) executing the external module to transform the operands into new operands;
   c) returning the new operands to the page description language description; and
   d) invoking a page description language operator to process the new operands.

34. The method of claim 33, wherein an external command operator of a page description language interpreter is invoked to transfer the operands to the external module in step (b).

35. The method of claim 33, wherein the page description language operator is the PostScript® image operator.

36. The method of claim 35, wherein step (a) further comprises redefining a new image operator to transfer the operands to the external module.

37. The method of claim 33, wherein step (a) further comprises the step of redefining a first setcolor operator to transfer the operands to the external module.

38. The method of claim 37, wherein the page description language operator invoked in step (d) is a second setcolor operator.

39. The method of claim 38, wherein the operands transferred to the external module comprise color components specified in a first color space and the new operands returned to the page description language description comprise color components specified in a second color space.

40. The method of claim 38, wherein the first setcolor operator is setrgbcolor and the second setcolor operator is setcmykcolor.

41. The method of claim 40, wherein the operands transferred to the external module are RGB specified color components and the new operands returned to the page description language description are CMYK specified color components.

42. The method of claim 33, wherein the operands comprise color components specified in a color space and the external module adjusts the color components.

43. The method of claim 42, wherein the new operands returned to the page description language description comprise the adjusted color components specified in the color space.

* * * * *